No. 730,671. PATENTED JUNE 9, 1903.
G. D. LUCE.
CANE HARVESTER.
APPLICATION FILED JULY 14, 1902.
NO MODEL. 3 SHEETS—SHEET 1.

No. 730,671. PATENTED JUNE 9, 1903.
G. D. LUCE.
CANE HARVESTER.
APPLICATION FILED JULY 14, 1902.
NO MODEL. 3 SHEETS—SHEET 2.

WITNESSES:
Geo. W. Naylor
C. R. Ferguson

INVENTOR
George D. Luce
BY Munn
ATTORNEYS.

No. 730,671. PATENTED JUNE 9, 1903.
G. D. LUCE.
CANE HARVESTER.
APPLICATION FILED JULY 14, 1902.
NO MODEL. 3 SHEETS—SHEET 3.
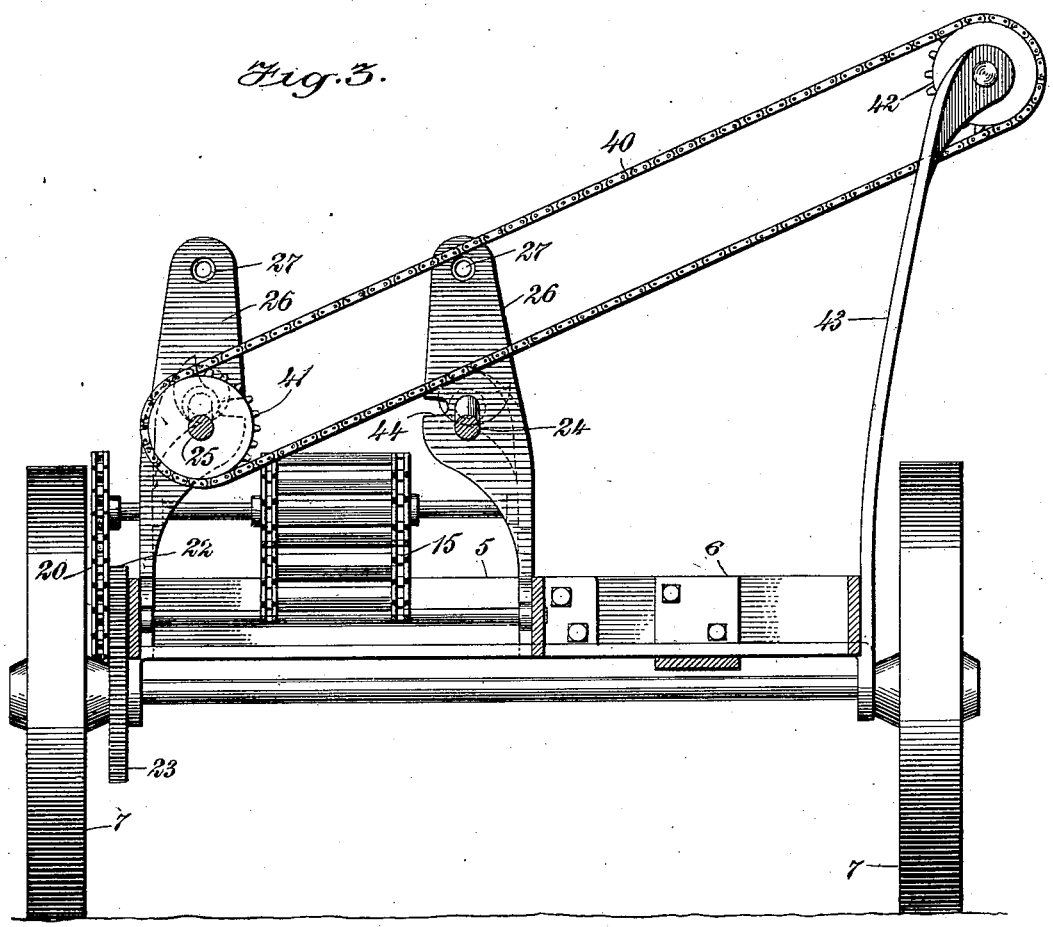
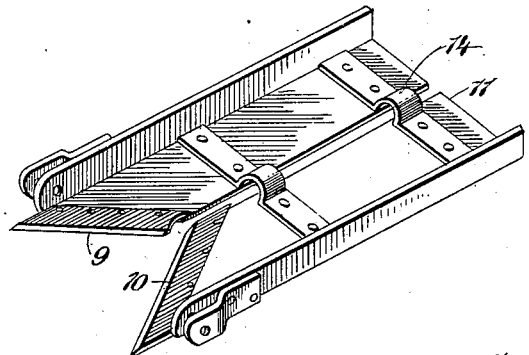
WITNESSES:
INVENTOR
George D. Luce
BY
ATTORNEYS.

No. 730,671. Patented June 9, 1903.

UNITED STATES PATENT OFFICE.

GEORGE DON LUCE, OF NEW ORLEANS, LOUISIANA.

CANE-HARVESTER.

SPECIFICATION forming part of Letters Patent No. 730,671, dated June 9, 1903.

Application filed July 14, 1902. Serial No. 115,435. (No model.)

*To all whom it may concern:*

Be it known that I, GEORGE DON LUCE, a citizen of the United States, and a resident of New Orleans, in the parish of Orleans and State of Louisiana, have invented a new and Improved Cane-Harvester, of which the following is a full, clear, and exact description.

This invention relates to improvements in machines for harvesting sugar-cane, the object being to provide a machine by means of which the cane may be rapidly cut close to the ground, topped, and stripped.

I will describe a cane-harvester embodying my invention and then point out the novel features in the appended claims.

Reference is to be had to the accompanying drawings, forming a part of this specification, in which similar characters of reference indicate corresponding parts in all the figures.

Figure 1:
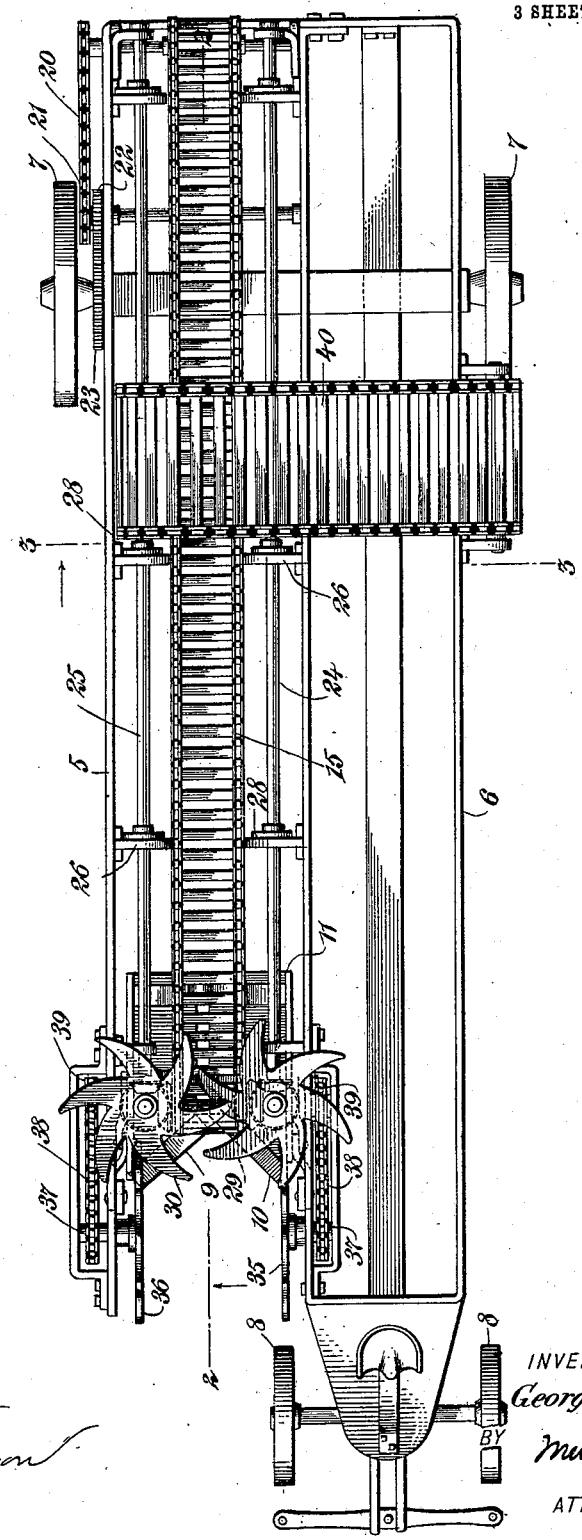
Figure 2:
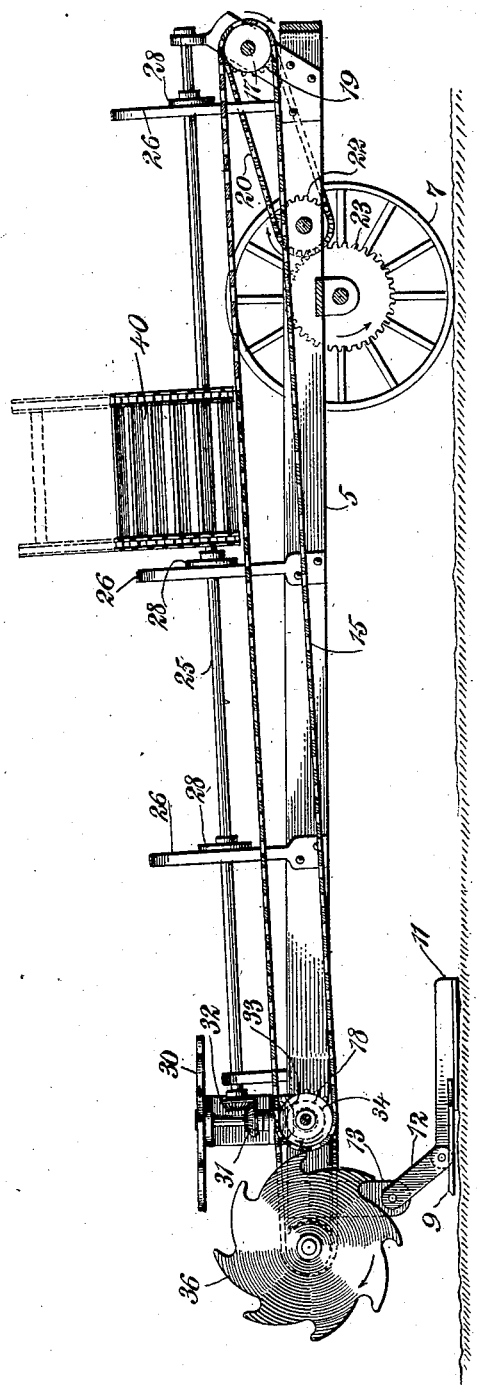

Figure 1 is a plan view of a cane-harvester embodying my invention. Fig. 2 is a section on the line 2 2 of Fig. 1. Fig. 3 is a section on the line 3 3 of Fig. 1, and Fig. 4 is a perspective view of a cutter employed.

The frame of the harvester comprises two sections 5 6, the section 5 supporting the operating parts, while the draft-animals are to be placed forward of the section 6, so as not to walk through the standing cane. The frame is mounted on the two rear wheels 7 and on the front wheels 8.

Supported at the forward end of the section 5 is the cutter, consisting of blades 9 10, connected to a drag 11, designed to be drawn upon the ground. As here shown, the drag is connected to hangers 13. The drag preferably consists of two sections spaced apart and connected by arched straps 14. This is to permit weeds and the like to pass between the two sections of the drag, and therefore prevent clogging of the cutters. These cutters are convergent inward, and one at the inner end slightly overlaps the other, so that cane cannot pass between them without being cut.

Operating on the frame is an endless carrier 15. This carrier passes around rollers 17 18 at the rear and front ends, respectively, of the frame, and on the shaft of the rear roller 17 is a sprocket-wheel 19, from which a chain 20 passes to a sprocket-pinion 21, mounted on the shaft of a pinion 22, which engages with a gear-wheel 23, attached to the axle of the rear wheels, this axle rotating with the wheels.

Extended along the opposite sides of the section 5 of the frame are shafts 24 25. These shafts extend through standards 26, said standards being provided with openings 27 for stripping purposes, as will be hereinafter described. At the side of each standard a topping-knife 28 is attached to the shafts.

Arranged at the forward portion of the section 5 of the frame and arranged to rotate on a horizontal plane are the toothed feeding-wheels 29 30. These wheels have curved teeth and are arranged one slightly above the other, so that while rotating the teeth of the two wheels will pass one above the other. On the shafts of the wheels 29 and 30 are bevel-pinions 31, which mesh with bevel-pinions 32 on the shafts 24 and 25. Also on the shafts of said wheels 29 and 30 are bevel-pinions 33, which engage with bevel-pinions 34 on the shaft of the roller 18.

Arranged slightly forward of the wheels 29 30 are the pick-up wheels 35 36, and on the shafts of these pick-up wheels are sprocket-wheels 37, from which chains 38 extend to sprocket-wheels 39 on the shaft of the roller 18. These pick-up wheels are provided with undercut teeth and are designed to raise cane that may be in a substantially horizontal position by being blown down or otherwise placed in such position.

Supported on the frame and extended laterally therefrom is an upwardly-inclined endless elevator 40. The chains of this elevator extend around sprocket-wheels 41, connected to the shaft 25, and around sprocket-wheels 42, the shaft of which has bearings in uprights 43 on the section 6 of the frame.

In the operation of the harvester as the machine is drawn along the wheels 29 and 30 will first grasp the cane, drawing it rearward or toward the harvester, and the cane will be cut by the blades 9 and 10 close to the ground. The cut cane will then be drawn upon the endless conveyer or carrier 15, from which it is lifted singly by boys or men, who place it in notches 44, formed in the standards 26, so that the blades 28 cut off the tops. After this cutting the cane is to be thrust into the holes 27, which strip off whatever leaves may remain on the stalks. Then the topped and stripped stalks are to be placed on the elevator 40, from which they will be discharged into a cart or wagon drawn alongside of the harvester.

Having thus described my invention, I claim as new and desire to secure by Letters Patent—

1. A cane-harvester comprising a carriage, a drag drawn by the carriage, cutters on the drag and an endless conveyer mounted on the carriage, substantially as specified.

2. A cane-harvester comprising a carriage, a cutter attached to the carriage and comprising a drag and inwardly-converging cutting-blades on the forward end thereof, and feeding-wheels on the carriage operating on a substantially horizontal plane, substantially as specified.

3. A cane-harvester comprising a carriage, a drag attached to the forward end of the carriage, cutter-blades on the forward end of the said drag, an endless carrier on the carriage, and toothed feeding-wheels rotating above the carriage at the forward end, substantially as specified.

4. A cane-harvester comprising a carriage, an endless conveyer operating thereon, a drag attached to the forward end of the carriage, cutting-blades on said drag, standards on the carriage and having openings and notches, shafts extended through the openings in the standards, and topping-cutters carried by the shafts, substantially as specified.

5. In a cane-harvester, a carriage, an endless conveyer on the carriage, an elevator supported on the carriage, a drag attached to the forward end of the carriage, cutting-blades attached to said drag, pick-up wheels at the forward end of the carriage, and feeding-wheels at the forward end of the carriage, substantially as specified.

6. A cane-harvester comprising a carriage, an endless conveyer on said carriage, an elevator supported on the carriage, shafts extended along said carriage, topping-cutters mounted on said shafts, a drag attached to the forward end of the carriage, cutters on said drag, lifting-wheels arranged at the forward end of the carriage and having undercut teeth, and feeding-wheels at the forward end of the carriage, the said feeding-wheels having curved teeth, the teeth of one wheel being adapted to overlap the teeth of the other wheel, substantially as specified.

7. A cane-harvester comprising a carriage, feeding devices carried by the carriage, and a drag consisting of two sections spaced apart, arched straps connecting the sections, and inwardly-converging blades at the forward end of the drag, said blades being separated at their inner ends but the end of one blade slightly overlapping the end of the other blade, substantially as specified.

8. A cane-harvester comprising a carriage, an endless conveyer mounted on the carriage, an elevator on the carriage, cutter-carrying shafts mounted on the carriage, feed-wheels on the forward end of the carriage, lifting-wheels on the forward end of the carriage, all of the above-mentioned parts being operated from the rear axle of the carriage, a drag having link connection with the forward end of the carriage, and cutters on said carriage, substantially as specified.

9. A cane-harvester comprising a carriage, cutting-blades arranged underneath the carriage and having swinging link connection therewith, feeding-wheels arranged within the carriage, and an endless conveyer on the carriage, substantially as specified.

In testimony whereof I have signed my name to this specification in the presence of two subscribing witnesses.

GEORGE DON LUCE.

Witnesses:
M. J. LUCE,
E. E. ADAMS.